A. S. DUNNING.
Process of Lining Furnaces.
No. 9,444. Reissued Nov. 2, 1880.
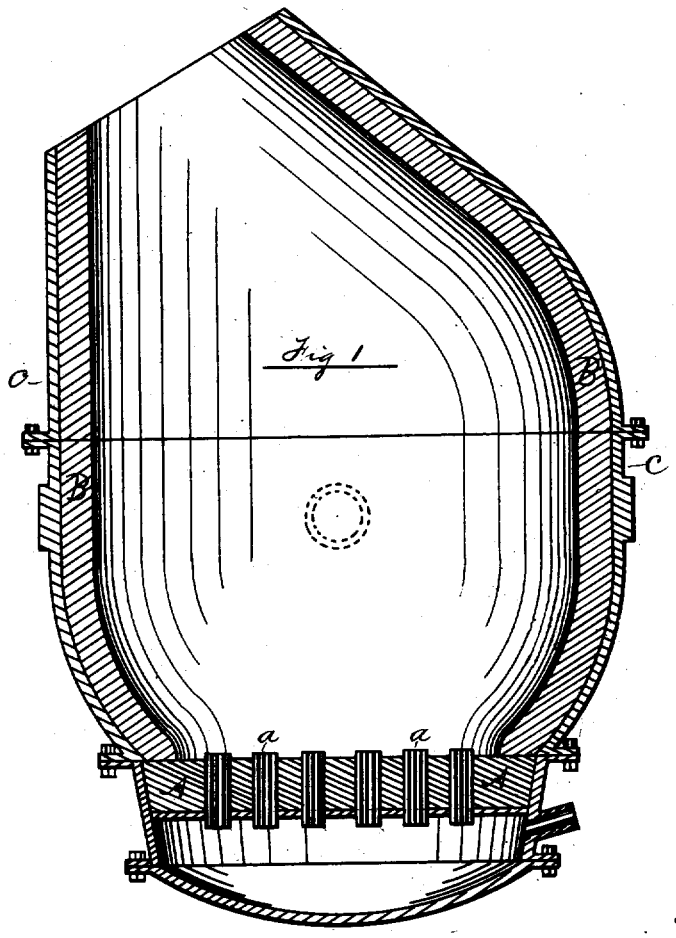
Witnesses
Thos H Hutchins
Wm J. Hutchins
Inventor
Almon S. Dunning
N. PETERS, PHOTO-LITHOGRAPHER, WASHINGTON, D. C.

UNITED STATES PATENT OFFICE.

ALMON S. DUNNING, OF JOLIET, ILLINOIS.

PROCESS OF LINING FURNACES.

SPECIFICATION forming part of Reissued Letters Patent No. 9,444, dated November 2, 1880.

Original No. 185,221, dated December 12, 1876. Application for reissue filed March 9, 1880.

*To all whom it may concern:*

Be it known that I, ALMON S. DUNNING, of the city of Joliet, in Will county, State of Illinois, have invented certain Improvements in the Process of Lining Furnaces, which are set forth in the following specification as applied to a Bessemer converter, the construction and operation of which I will proceed to explain, reference being had to the annexed drawing, making a part of this specification, which is a vertical sectional view of the converter with the lining in.

The nature of my invention consists in the process or mode of lining the interior fire-surface of the converter C. This I do by mixing up a fire-proof mixture of any desired material about the consistency of stiff mortar, so that it can be rolled up in balls by hand. These balls I then lay, one on the other, all around the interior of the converter, and while soft press by hand into a compact wall or lining (shown at B) and also in the bottom around the tuyeres *a* at A.

By this mode the converter can be lined in very much less time and at vastly less expense than in any of the old modes commonly in use.

I am aware that fire-bricks as a backing with a thin mortar-like solution spread over their inside face have been used to line up the interior of such a converter, and I am also aware that a dampened mixture has been used as a lining by being tamped in in layers.

I am not aware that a soft plastic mixture put in as described without being tamped in in layers has ever been used.

After the plastic mixture is laid up in a wall for a lining, as described, a fire is used in the converter to dry it before its use. It then becomes one continuous homogeneous mass that gives better results than any other lining yet in use.

I am aware that the bottom containing the tuyeres *a* has been lined by having a course of brick between the shell *c* and the tuyeres *a*, and a dampened mixture put in by tampers between the bricks and the tuyeres and among the tuyeres. By that process the dampened mixture has been tamped in in thin layers, which layers are liable to blow out, disabling the converter from making more than from one to ten heats without a new-lined bottom, while by the process I now use the converter will run from ten to twenty-four heats at a less expense by one-half than when lined by the old mode.

I regard the lining of the bottom by means of the plastic material as before described as the more important part of my invention, because the blowing out of the lining is thoroughly prevented, as it becomes when dried, as set forth, one solid homogeneous mass incapable of blowing out in layers or pieces.

No other bottom has been constructed without seams as this. The seams allow the metal to enter, and the result is the bottom becomes loosened and blows out, while this, instead of blowing out or scaling off, simply burns off or wears out on its fire-surface.

Having thus described my invention, what I claim as new, and desire to secure by Letters Patent, is as follows, to wit:

The process of lining furnaces which consists in laying stiff fire-proof mortar in balls around the interior surface and in the bottom of the vessel about the tuyeres, and then pressing them down into a uniform surface and homogeneous lining, substantially as herein shown and described.

ALMON S. DUNNING.

Witnesses:
THOS. H. HUTCHINS,
WM. J. HUTCHINS.